United States Patent [19]

Funahashi et al.

[11] Patent Number: 5,548,281

[45] Date of Patent: Aug. 20, 1996

[54] DATA TRANSMISSION SYSTEM

[75] Inventors: Yasuhiro Funahashi; Kazunori Ikami; Osamu Nishimura, all of Nagoya; Yoshihiko Hibino, Hashima-gun; Yuji Kiyohara; Yuichi Yasutomo, both of Nagoya, all of Japan

[73] Assignees: Brother Kogyo Kabushiki Kaisha; Xing, Inc., both of Aichi-ken, Japan

[21] Appl. No.: 274,760

[22] Filed: Jul. 14, 1994

[30] Foreign Application Priority Data

Jul. 16, 1993 [JP] Japan ................................ 5-177015

[51] Int. Cl.⁶ ..................................................... H04Q 1/00
[52] U.S. Cl. ........................ 340/825.080; 381/77
[58] Field of Search ......................... 340/825.08; 381/77; 434/307 A; 395/250

[56] References Cited

U.S. PATENT DOCUMENTS

| | | | |
|---|---|---|---|
| 4,595,921 | 6/1986 | Wang | 340/825.08 |
| 4,940,974 | 7/1990 | Sojka | 340/825.08 |
| 5,194,846 | 3/1993 | Lee | 340/825.08 |
| 5,276,810 | 1/1994 | Kitamura | 395/250 |

*Primary Examiner*—Brian Zimmerman
*Attorney, Agent, or Firm*—Oliff & Berridge

[57] ABSTRACT

In a data transmission system, a center and a plurality of terminals are connected by a coaxial cable. The center is controlled by a server to transmit mode sense polling signals in succession every predetermined time (for example every 30 seconds) to all of the karaoke terminals connected to the center. The center determines whether each terminal is in a karaoke mode or not based on the mode response signal transmitted from each terminal in response to the mode sense polling signals. The center then transmits request polling signal only to terminals determined as being in the karaoke mode, confirms whether a request for a song has been made, and transmits karaoke data to those terminals that have a request.

14 Claims, 8 Drawing Sheets

5,548,281

DATA TRANSMISSION SYSTEM

BACKGROUND OF THE INVENTION

1. Field of the Invention

The present invention relates to a data transmission system wherein a central control unit and a plurality of terminals are connected by a transmission line, the data transmission system being for transmitting information data from the central control unit to the terminals.

2. Description of the Related Art

Conventionally, there is known a data transmission system, wherein a center (central control unit) is connected to a plurality of terminals by a transmission line. The data transmission system is for transmitting information data including various types of information to a terminal from a center according to demands from the terminal side. An advantage of this type of data transmission system is that a memory device for prestoring data information need not be provided to each terminal, so that the terminals have an extremely simple construction.

SUMMARY OF THE INVENTION

In the data transmission system, it can be proposed that transmission and reception of the information data is controlled by polling between the center and the terminal. That is, a polling signal is transmitted in succession from the center to the plurality of terminals. Every terminal is interrogated to determine which requests transmission of information data. When there is a transmission request at a terminal that has received the polling signal, the request data, which indicates the content and the like of the request, is transmitted from the terminal to the center. After the signal has been received at the center side, the desired information data is transmitted to the terminal.

According to this method, however, because the data transmission system interrogates about data transmission requests at all the terminals in succession, a transmission request made at a terminal will not be responded to until polling for all other terminals is completed. This will cause a problem in that a long time is required for the desired data to be transmitted from the center. Particularly, a large scale system with outdoor cables can have a great many terminals so that information data can not be transmitted quickly to individual terminals.

It is therefore, an object of the present invention to overcome the above-described problems and to provide a data transmission system wherein a terminal can obtain desired information data with a short waiting time.

In order to attain these and other objects, the present invention provides a data transmission system for controlling transmission of information data via a transmission line from a central control unit to a plurality of terminals, the data transmission system including: a central control unit; and a plurality of terminals connected to said central control unit via a transmission line, wherein said central control unit includes a mode sense polling signal transmission device for transmitting a mode sense polling signal, via the transmission line, to each of the plurality of terminals for confirming an operation mode of each terminal; wherein each of said plurality of terminals includes a mode response signal transmission device for transmitting, in response to the mode sense polling signal, a mode response signal indicating a present operation mode of the each terminal to said central control unit via the transmission line, wherein said central control unit further includes: a determination device for determining the operation mode of each terminal, based on the mode response signal transmitted from each terminal; and request polling signal transmission device for selectively transmitting a request polling signal to a terminal that is determined by the determination device to be in the predetermined operation mode for detecting whether the terminal requests transmission of information data, wherein each of said plurality of terminals further includes a request response signal transmission device for transmitting a request response signal indicating whether or not the terminal requests the transmission of information data when the terminal receives the request polling signal transmitted from the request polling signal transmission device, and wherein said central control unit further includes an information data transmission device for selectively transmitting information data to a terminal that has transmitted the request response signal indicating that the terminal requests the transmission of the information data.

According to another aspect, the present invention provides a data transmission device for transmitting information data via a transmission line to a plurality of terminals, upon requested by the plurality of terminals, the data transmission device including: a mode sense polling signal transmission device for transmitting a mode sense polling signal to each of a plurality of terminals connected to the data transmission device via a transmission line, to thereby detect an operation mode of the each terminal; a request polling signal transmission device for selectively transmitting a request polling signal to a terminal that is detected by said mode sense polling signal to be in a predetermined operation mode, to thereby detect whether or not the terminal requests transmission of information data; and an information data transmission device for transmitting the information data to the terminal that is detected by the request polling signal transmission device to request the transmission of the information data.

According to a further aspect, the present invention provides a method of controlling transmission of information data via a transmission line from a central control unit to a plurality of terminals, the plurality of terminals being connected to the central control unit via the transmission line, the method including the steps of: transmitting a mode sense polling signal from a central control unit via a transmission line to each of a plurality of terminals for confirming an operation mode of each terminal; transmitting, from each terminal to the central control unit via the transmission line, a mode response signal indicating a present operation mode of the each terminal, in response to the mode sense polling signal; determining the operation mode of each terminal, based on the mode response signal transmitted from each terminal; selectively transmitting a request polling signal from the central control unit to a terminal that is determined to be in the predetermined operation mode for detecting whether the terminal requests transmission of information data; transmitting, from the terminal that has received the request polling signal to the central control unit, a request response signal indicating whether or not the terminal requests the transmission of information data, in response to the request polling signal; selectively transmitting information data from the central control unit to a terminal that has transmitted the request response signal indicating that the terminal requests the transmission of the information data.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
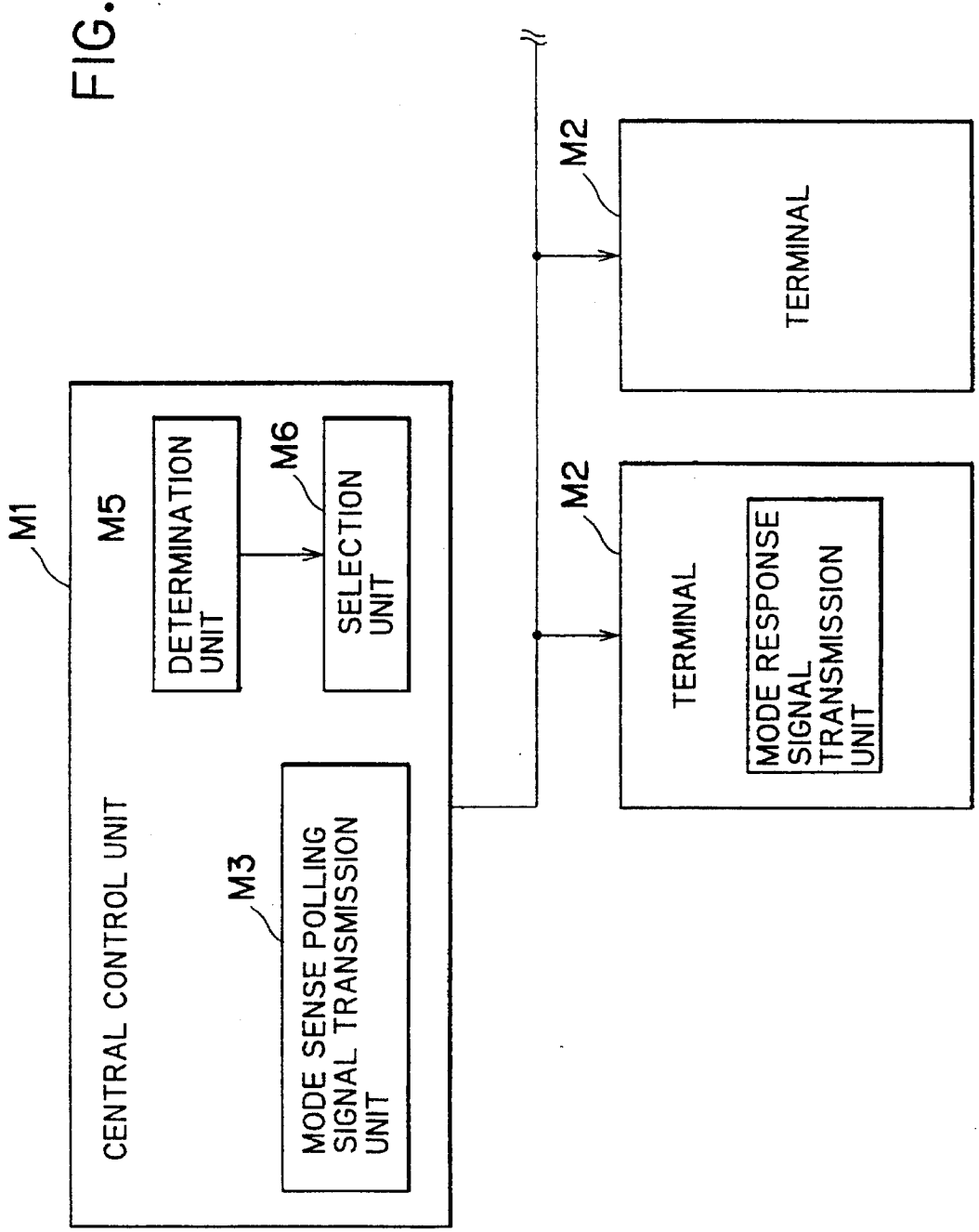
FIG. 1 is a schematic structural diagram showing the basic structure of a data transmission system of a preferred embodiment of the present invention.

A data transmission system according to a preferred embodiment of the present invention will be described while referring to the accompanying drawings wherein like parts and components are designated by the same reference numerals as those shown in FIGS. 1 through 8 to avoid duplicating description.

A data transmission system of an embodiment of the present invention will be described below with reference to FIG. 1.

In the data transmission system of the embodiment, a central control unit M1 and a plurality of terminals M2 are connected by a transmission line. The data transmission system is for transmitting information data (including image information and/or sound information) from the central control unit M1 to the terminals M2 that have requested the transmission of the information data. According to the present invention, the central control unit includes a mode sense polling signal transmission unit M3 for transmitting to all the terminals M2 mode sense polling signals for confirming respective operation mode of the terminals. Each terminal M2 includes a mode response signal transmission unit M4 for transmitting a mode response signal indicating the present operation mode of the each terminal to the central control unit M1, in response to the mode sense polling signal transmitted from the central control unit M1. The central control unit M1 further includes: a determination unit M5 for determining the present operation mode of each terminal M2 based on the mode response signals transmitted from the each terminal M2; and a selection unit M6 for selectively transmitting request polling signals to the terminals M2 depending on the operation mode of the terminals determined by the determination unit M5 so as to confirm requests for transmission of information data. In response to the request polling signal, the terminals M2 transmit information data request signals to the central control unit M1. Receiving information data request signals, the central control unit M1 transmits the information data to the terminals M2 that have requested the transmission of the information data.

In the data transmission system of the present embodiment having the above-described structure, the central control unit M1 and the plurality of terminals M2 are connected by the transmission line.

In the data transmission device according to the present invention, the mode sense polling signal transmission unit M3 of the central control unit M1 transmits to each terminal M2 a mode sense polling signal for confirming operation mode of the terminal M2. The mode response signal transmission unit M4 of each terminals M2 transmits, in response to the mode sense polling signal, a mode response signal indicating its own present operation mode to the central control unit M1.

The determination unit M5 in the central control unit M1 determines the operation mode of each terminal M2 based on the mode response signal transmitted from the terminal M2. The selection unit M6 in the central control unit M1 selects whether or not to transmit a request polling signal to the terminal M2 depending on the operation mode determined by the determination unit M5. The central control unit M1 then transmits the request polling signals to the selected terminals M2 for confirming that the terminals M2 have requested transmission of information data. In response to the request polling signal, the terminals M2 transmit the information data request signals to the central control unit M1. Based on information data request signals, the central control unit transmits information data to the terminals M2.

Accordingly, the central control unit M1 can determine not to transmit request polling signals to terminals M2 that are now set to operation modes where information data is not needed. Therefore, the number of terminals M2 to which request polling signals are transmitted can be reduced and wasted polling time can be eliminated. Accordingly, the waiting time until a request polling signal is received at a terminal is reduced and desired information can be obtained in a short waiting time.

A concrete example of the above-described data transmission device of the present invention will be described below with reference to FIGS. 2 through 8. This example is a karaoke system to which applied is the above-described embodiment of the present invention. In the karaoke system, a plurality of karaoke terminals and a center (central control unit) are connected by a transmission line.

Figure 2:
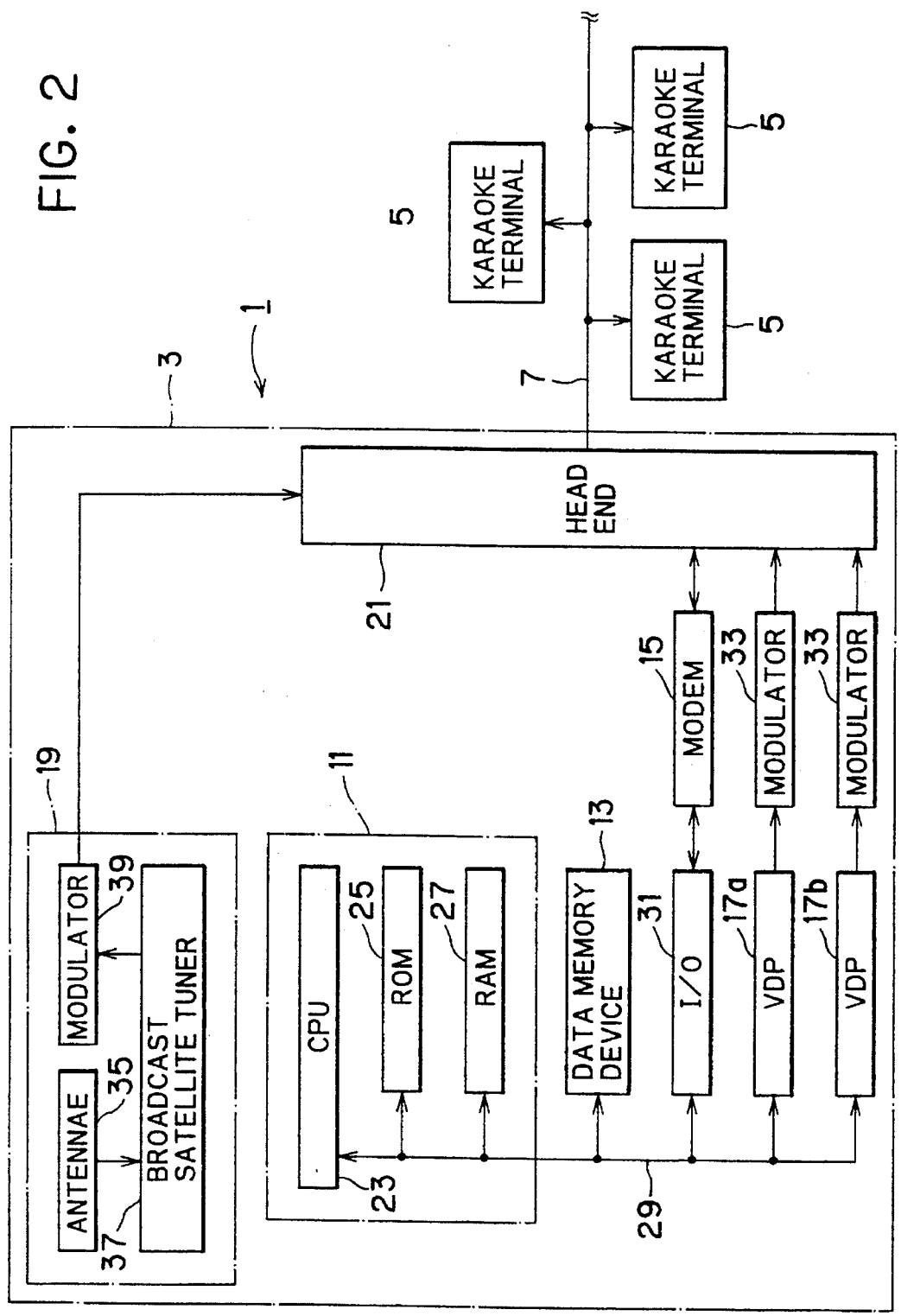
FIG. 2 is a block diagram showing schematic structure of an overall karaoke system and structure of a center according to a concrete example of the embodiment.

As shown in FIG. 2, the karaoke system 1 according to the present example is constructed from a center 3 connected to a plurality of karaoke terminals 5 by a coaxial cable 7 (transmission line). The terminals 5 can be provided in separate buildings or in separate shops or booths within the same building.

Next, an explanation of configuration of the center 3 will be provided while referring to FIG. 2.

The center 3 includes a server (control portion) 11 for performing overall control of the center 3; a memory device 13 in which karaoke song data are stored; a center modem 15; background image output devices (VDP) 17a and 17b; broadcast satellite reception system 19; a head end 21, etc.

The server 11 includes well-known components such as a central processing unit (CPU) 23, a ROM 25, and a RAM 27. A busline 29 is provided for connecting the server 11 to the memory device 13, an input/output interface (I/O) 31, the background image output devices 17a and 17b, and the like.

The RAM 27 stores a mode management table for indicating a present operation mode of each of the plurality of terminals 5.

The server 11 is for producing a mode sense polling signal and a request polling signal. The mode sense polling signal is a signal for confirming an operation mode of each terminal 5. The request polling signal is a signal for confirming whether a request for transmission of karaoke song data is present at each terminal that is in the karaoke mode.

More specifically, the server 11 produces a mode sense polling signal added with an address code corresponding to each of the plurality of terminals 5. More specifically, if the total number of the terminals 5 connected to the center 3 is N (integer more than 1), each of the terminals is numbered at a terminal number n (n is an integer number: $1 \leq n \leq N$). The server 11 produces the N total number of mode sense polling signals, each of which is added with an address code indicating the terminal number n. Accordingly, when a mode sense polling signal is transmitted via the transmission line to the plurality of karaoke terminal 5, each karaoke terminal 5 refers to this address code to determine whether the mode sense polling is for itself.

Similarly, the server 11 produces a request polling signal added with an address code indicating the terminal number n. Accordingly, when a request polling signal is transmitted via the transmission line to the plurality of karaoke terminal 5, each karaoke terminal 5 refers to this address code to determine whether the mode sense polling is for itself.

A large-capacity memory device, such as a hard disk or an optical magnetic disk, is used in the memory device 13. Several thousand songs worth of karaoke song data are stored in the memory device 13.

Figure 4:
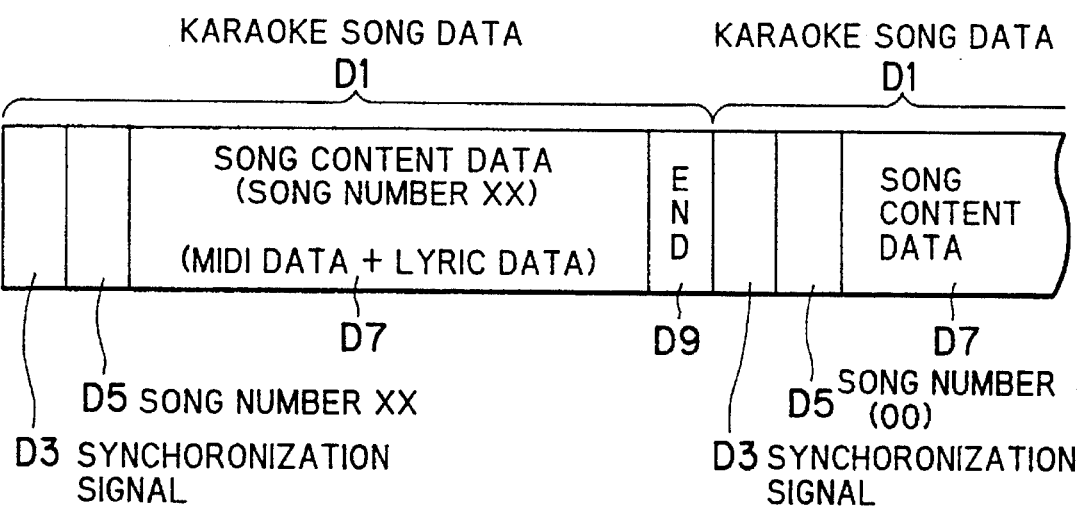
FIG. 4 is an explanatory diagram showing structure of a karaoke song data of the embodiment.

As shown in FIG. 4, one song worth of karaoke song data D1 includes: a synchronization signal D3; song number data D5 that indicates the song number; song content data D7; and partition data D9 for indicating the end of the one song worth of karaoke song data. The song content data D7 includes lyric data, for being projected on a monitor television of the terminal 5 (to be described later), and instrumental or vocal accompaniment data, for being played by a sound source of the terminal 5 (to be described later). It is noted that the accompaniment data is MIDI (Musical Instrument Digital Interface) standard data.

The center modem 15 is for modulating karaoke song data retrieved from the memory device 13, mode sense polling signals and request polling signals outputted from the server 11, and the like into alternating current signals of a predetermined same channel (that is, a predetermined same frequency band), and then outputting the alternating current signals to the head end 21.

The background image output devices (video disk players) 17a and 17b are for outputting background image data (video signals according to standard National Television System Committee (NTSC) system) for projecting on the monitor television of the terminal 5 (to be described later). The background image data are categorized according to genre of karaoke songs requestable by the terminals 5. In this concrete example, one output device 17a may store image data directed toward Japanese ballads, and the other output device 17b may be store image data directed toward popular songs. Each of background image output devices 17a and 17b is connected to an individual modulator 33. The background image data outputted from the output devices 17a and 17b are modulated by the corresponding modulators 33 into alternating current signals of channels (frequency bands) different from each other. The alternating current signals of the different channels are inputted to the head end 21.

It is noted that the channels for the background image data are different from the channel over which the karaoke song data, the mode sense polling signals and the request polling signals are transmitted. It is further noted that each of the devices 17a and 17b always outputs the background image data. Accordingly, the background image data are always transmitted to the terminals 5.

The broadcast satellite reception system 19 includes a reception antennae 35, a broadcast satellite tuner 37, and a modulator 39. The modulator 39 is connected to the head end 21. The tuner 37 outputs broadcast satellite signals including broadcast satellite image signals and broadcast satellite sound signals. The modulator 39 modulates the broadcast satellite signals from the tuner 37 into alternating current signals of a channel (frequency band) which is different from the channel (frequency band) over which the karaoke song data, the mode sense polling signals, and the request polling signals are transmitted and the channels (frequency bands) over which the background image data are transmitted. It is further noted that the tuner 37 always outputs the broadcast satellite signals. Accordingly, the broadcast satellite signals are always transmitted to the terminals 5.

The head end 21 includes a variety of devices (not shown) such as a mixer for mixing signals inputted thereto and for outputting the mixed signals to the coaxial cable 7. Modulated signals of karaoke song data sent from the center modem 15; mode sense polling signals and request polling signals sent from the center modem 15; background image signals from the modulators 33; and broadcast satellite signals from the modulator 39 which have been modulated in different channels are inputted to the head end 21. The head end 21 multiplexes the plurality of different channel signals, and outputs them to the coaxial cable 7, along which the multiplexed signals are transmitted to the terminals 5.

Figure 3:
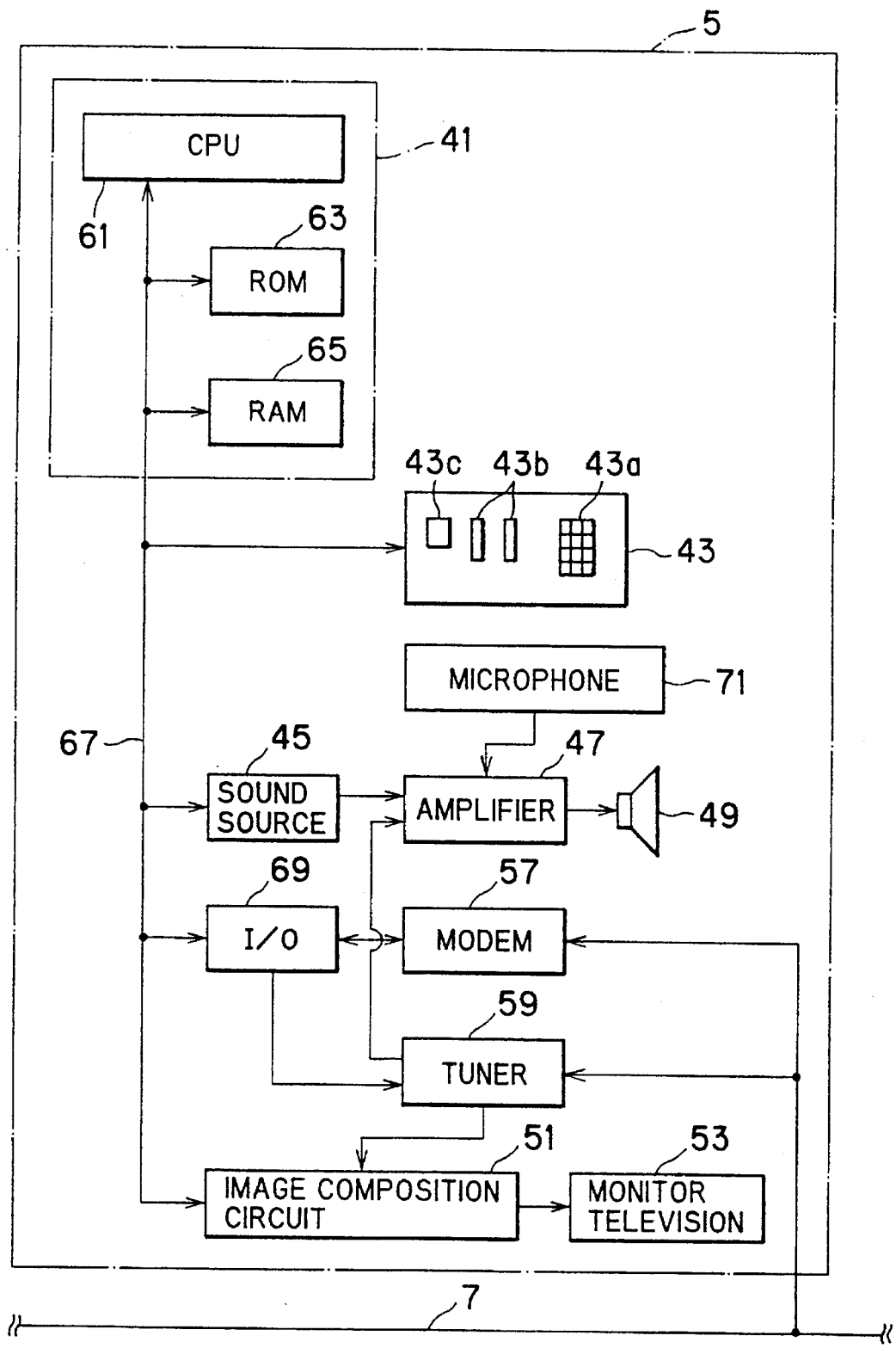
FIG. 3 is a block diagram showing structure of a terminal of the concrete example of the embodiment.

Next, an explanation of the structure of each terminal 5 will be provided while referring to FIG. 3.

Each karaoke terminal 5 includes a control portion 41 for overall control of the terminal, an input device 43, a sound source 45, an amplifier 47, a speaker 49, an image composition circuit 51, a monitor television 53, a terminal modem 57 for receiving and processing the signals (the plurality of karaoke song data, the mode sense polling signals and the request polling signals) sent from the center 3, and a video tuner 59 for receiving and processing the signals (the background image data and the broadcast satellite signals) sent from the center 3.

The control portion 41 includes a CPU 61, a ROM 63, and RAM 65 and is connected to the input device 43, the sound source 45, an input/output interface 69, the image composite circuit 51, and the like via a busline 67.

The RAM 65 previously stores therein a song name/song genre information data indicating a genre of each of a plurality of karaoke songs requestable by the terminals 5. Examples of genre include Japanese ballads (enka) and popular songs, in this concrete example. The RAM also serves to temporarily store karaoke song data for a karaoke song requested at the input device 43 which has been transmitted from the center 3. The RAM 65 is formed with an operation mode table for storing the present operation mode of the corresponding terminal 5. The RAM 65 is also formed with a song number maintenance memory for storing the song number of a karaoke song requested by the input device 43.

The control portion 41 is for producing a mode response signal and a request response signal. The mode response signal is a signal by which each terminal responds to the center 3 about its own operation mode in response to a mode sense polling signal from the center 3. Also, the request response signal is a signal for responding to the center 3 about whether there is a request for a song (that is, a request for transmission of karaoke song data) in response to a request polling signal from the center 3.

More specifically, the control portion 41 produces the mode response signal, referring to the operation mode table formed in the RAM 65. The mode response signal is added with data indicating the present operation mode of the corresponding terminal. The control portion 41 produces the request response signal, referring to the song number maintenance memory formed in the RAM 65. If a request has been made, the song number data of the requested karaoke song stored in the song number maintenance memory is attached to the request response signal.

The input device 43 includes a variety of key switches by which a user operates the terminal 5. More specifically, the input device 43 includes a number pad (ten key) 43a for inputting song numbers of requested songs; mode keys 43b for selecting various operation modes; a power source switch 43c for turning the power source on and off; and the like. The operation modes of the terminal 5 include a karaoke mode for receiving karaoke song data transmitted from the center 3 and for performing karaoke; and a broadcast satellite mode for receiving a broadcast signal from the center 3 and allowing viewing of the satellite broadcast.

The terminal modem 57 is for receiving and demodulating the karaoke song data, the mode sense polling signals, and the request polling signals that are transmitted from the center 3 via the coaxial cable 7. The terminal modem 57 also modulates signals, such as mode response signals and request response signals outputted from the control portion 41, and transmits them to the center 3. Processes for transmitting these signals will be described later.

The video tuner 59 is for receiving the satellite broadcast signals, outputted from the broadcast signal system 19 and transmitted from the center 3, and the background image signals, outputted from the background image output devices 17a and 17b and transmitted from the center 3, and for selecting the channel of the desired image signal. That is, when the karaoke mode is designated as the operation mode using the mode key 43b of the input device 43, one of the channels over which the background image signals are transmitted is selected. When the broadcast satellite mode is designated as the operation mode using the mode key 43b of the input device 43, the channel over which the broadcast satellite signals are transmitted is selected.

A microphone 71 is provided in each terminal 5 to produce a singing voice signal when a user sings into the microphone.

The sound source (synthesizer sound source) 45 is for converting the MIDI data (accompaniment data), included in the karaoke song data shown in FIG. 4, into an analog karaoke accompaniment/sound signal.

The amplifier 47 is for receiving both the karaoke accompaniment/sound signal and the singing voice signal from the microphone 71. The amplifier 47 mixes the accompaniment/ sound signal and the singing voice signal, amplifies the mixed signal, and outputs it to the speaker 49. The amplifier 47 is also for receiving, from the tuner 59, the broadcast satellite sound signal included in the broadcast satellite signal.

The image composition circuit 51 converts lyric data, included in the karaoke song data, into a lyric image signal, superimposes it onto a background image signal inputted from the video tuner 59, and outputs it to the monitor television 53. The image composition circuit 51 is also for receiving, from the tuner 59, the broadcast satellite image signal included in the broadcast satellite signal.

Next, an explanation of operation of the karaoke system 1 according to the present embodiment having the above-described structure will be provided.

First, an explanation of the operation of the center 3 will be provided.

Figure 5:
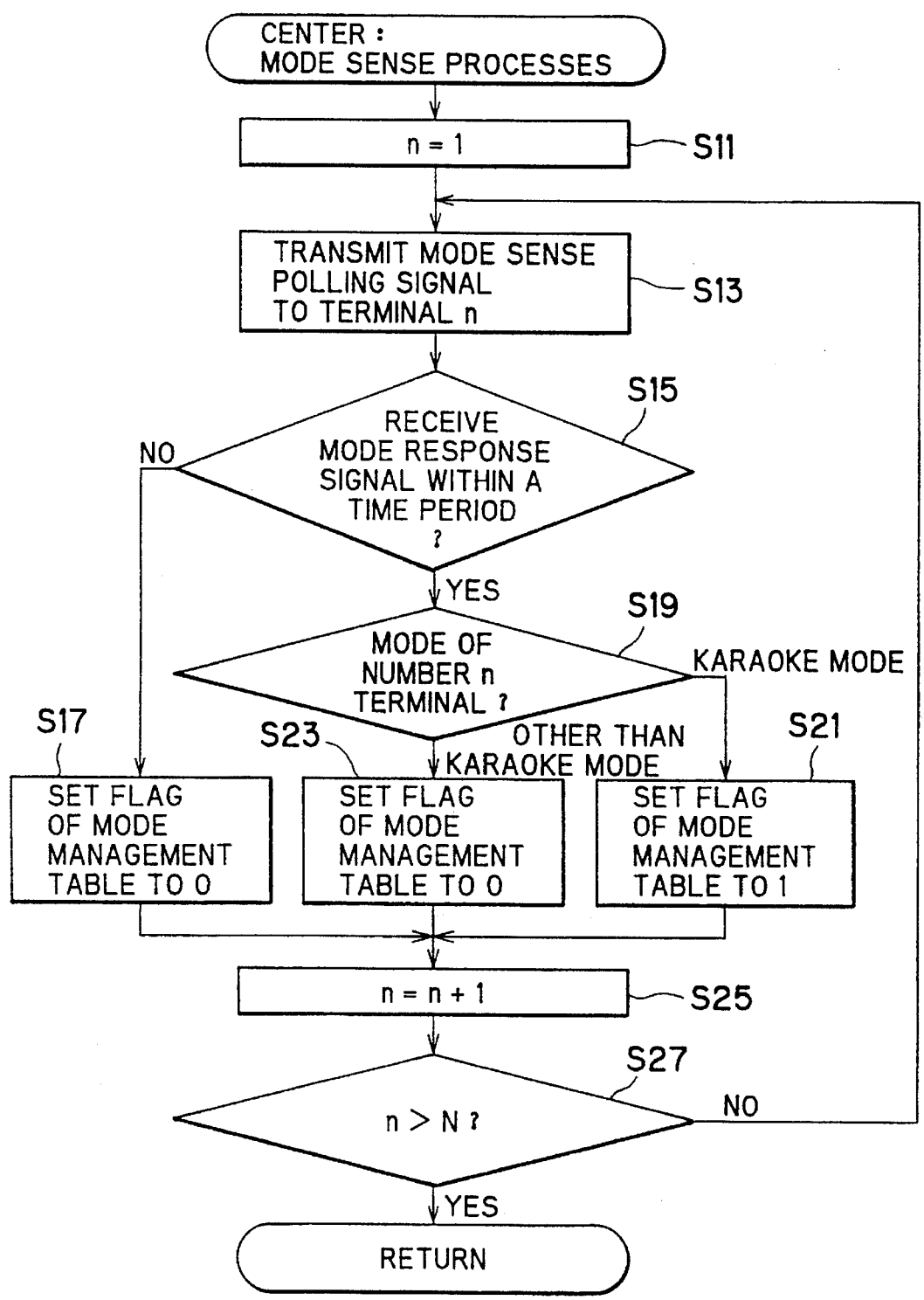
FIG. 5 is a flowchart showing mode sense operations in the center of the present embodiment.
Figure 6:
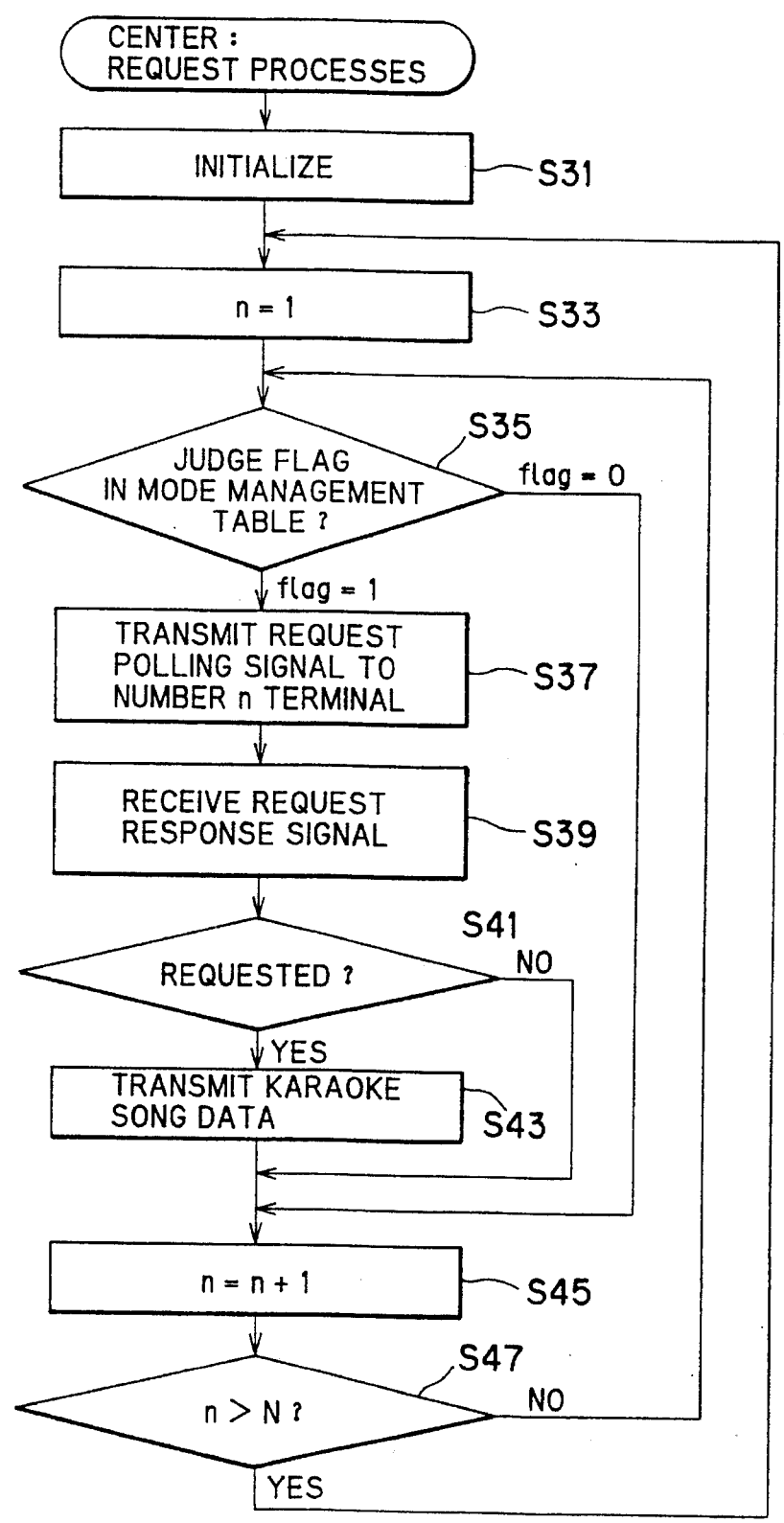
FIG. 6 is a flowchart showing request operations in the center of the present embodiment.

The server 11 in the center 3 executes mode sense processes shown in the flowchart in FIG. 5 and the request processes shown in the flowchart in FIG. 6. The mode sense processes transmit the mode sense polling signals to all of the plurality of terminals 5 so as to detect the respective operation modes of all the terminals. The request processes transmit the request polling signals only to the terminals 5 that are determined by the mode sense processes to be in the karaoke mode so as to detect whether the terminals in the karaoke mode request transmission of karaoke songs.

The request processes of FIG. 6 are continually executed. Request polling signals, for interrogating whether or not a song request is present, are transmitted only to terminals 5 that are determined to be in karaoke mode by the mode sense processes.

The mode sense processes of FIG. 5 are repeatedly executed every predetermined time period (for example, every 30 seconds) by a timer interrupt of the request processes. That is, the request processes are interrupted every predetermined time period, and the mode sense processes are executed. Mode sense polling signals are transmitted in succession to all of the karaoke terminals 5 connected to the center 3. Each terminal 5 transmits a mode response signal in response to these mode sense polling signals. The center 3 determines whether or not each terminal 5 is in the karaoke mode based on the mode response signals.

The mode sense processes will now be described while referring to FIG. 5. In the mode sense processes, the CPU 23 in the server 11 first sets the terminal number n to 1, in step S11. Then, the CPU 23 produces a mode sense polling signal added with the address code indicating the terminal number n, in step S13. The modem 15 modulates the mode sense polling signal and outputs it toward all the terminals 5. Upon receiving the polling signal, each of the karaoke terminals 5 refers to the address code attached to the mode sense polling signal to determine whether this mode sense polling signal is for itself. Accordingly, the number n terminal 5 determines that the mode sense polling signal added with the address code of the corresponding terminal number n is for itself.

Next, the program waits for reception of a mode response signal transmitted from the number n terminal 5 in response to the mode sense polling signal in step S15. It is noted that data indicating the present operation mode of the number n terminal is attached to the mode response signal.

When a mode response signal is not transmitted within a predetermined period of time in step S15, the terminal is determined to be turned off. Accordingly, in step S17, the CPU 23 sets, to zero (0), a flag for the number n terminal in the mode management table in the RAM 27. On the other hand, when a mode response signal is received in the step S15 within the predetermined time period, the server 11 processes the mode response signal. That is, the server 11 refers to the data added to the mode response signal indicating the present operation mode of the number n terminal 5, and determines whether the operation mode of the number n terminal 5 is karaoke mode or not, in step S19. If the number n karaoke terminal 5 is in the karaoke mode, the CPU 23 sets the flag for the number n terminal of the mode management table to one (1) in step S21. If the number n karaoke terminal 5 is in the broadcast satellite or some other mode, then the flag is set to zero (0) in step S23.

Next, the CPU 23 increments the terminal number n by one (1) (n=n+1) in step S25. Then, the CPU 23 judges whether the terminal number n is greater than the maximum terminal number N (=the total number of the terminals 5 connected to the center 3), in step S27. If determined not to be greater, the program returns again to the step S13 and the processes in steps S13 through S25 are repeated on the number n+1 terminal 5. Accordingly, mode sense polling signals are transmitted in succession to all of the terminals number 1 (first) through N so as to confirm the present operation mode of each terminal 5. On the other hand, if n is determined as being greater than N in step S23, the program returns to the request processes of FIG. 6.

In this way, in the mode sense processes, whether each terminal is in karaoke mode or not is determined according to the mode response signal transmitted from each terminal, and the results of the determinations are stored in the RAM 27. That is, when a mode response signal is received that indicates a terminal is in karaoke mode, the terminal is determined as being in karaoke mode and the mode flag is set to one (1). When a signal is not transmitted within a predetermined time, and when a mode response signal is received that indicates a mode other than the karaoke mode, that the mode is not karaoke mode is determined and the flag is set to zero (0).

The request processes of FIG. 6 will now be described below.

When the center 3 is turned ON, the CPU 23 starts conducting the request processes. The CPU 23 continues executing the request processes, until the center 3 is turned OFF.

In the request processes, the CPU 23 first performs initialization to clear the RAM 27 and the like, in step S31. Then, in step S33, the CPU 23 sets the terminal number n to one (1).

The CPU 23 refers the flag for the number n terminal 5 in the mode management table of the RAM 27 in step S35. When the flag is determined as one (1), it is determined that the number n terminal is in the karaoke mode. Accordingly, the CPU 23 produces a request polling signal added with the address code indicating the terminal number n. The modem 15 modulates the request polling signal and outputs it toward all the terminals 5, in step S37. Upon receiving the request polling signal, each of the karaoke terminals 5 refers to the address code attached to the request polling signal to determine whether this request polling signal is for itself. Accordingly, the number n terminal 5 determines that the request polling signal added with the address code of the corresponding terminal number n is for itself.

Then, in step S39, a request response signal is transmitted from the number n terminal 5 to the center 3, in response to the request polling signal. The request response signal transmitted from the number n terminal indicates whether there is a request for a karaoke song at the number n terminal. When a request has been made at the number n terminal, the request response signal is added with the song number data and the like of the requested song. Accordingly, in step S41, the CPU 23 processes the request response signal to judge whether there is a song request at the number n terminal. If it is determined that a request has been made at the number n terminal, in step S43, the CPU 23 retrieves the karaoke song data for the requested song from the memory device 13, based on the song number data and the like included in the request response signal. The CPU 23 then transmits the karaoke song data to the number n terminal 5.

It is noted that in this step S43, the karaoke song data in the form as shown in FIG. 4 retrieved from the memory device 13 is added with an address code indicating the terminal number n, similarly to the mode sense polling signal and the request polling signal. The modem 15 modulates the karaoke song data and outputs it toward all the terminals 5. Upon receiving the karaoke song data, each of the karaoke terminals 5 refers to the address code attached thereto to determine whether this karaoke song data is for itself. Accordingly, the number n terminal 5 determines that the karaoke song data added with the address code of the corresponding terminal number n is transmitted for itself.

The program then proceeds to the next step S45. If it is determined in the step S41 that there has been made no request in the number n terminal, the program proceeds directly to the step S45.

Similarly, if the flag for the number n terminal in the mode management table of RAM 27 is determined to be zero (0) in the step S35, because it is determined that the number n terminal is not in the karaoke mode, the program proceeds directly to the step S45 without executing the above steps S37 through S43. That is, the request polling signals are not transmitted to the terminals not in the karaoke mode.

Then, in the step S45, the terminal number n is incremented by one (1) (n=n+1). The program then proceeds to step S47 to judge whether the terminal number n is greater than the maximum terminal number N (=total number of the terminals 5 connected to the center 3). If determined as not greater, the program returns again to step S35 and the processes in steps S35 through S45 are repeated on the number n+1 terminal. On the other hand, if n is determined as being greater than N in step S47, the program returns to step S33 where the terminal number n is set to one (1) and the processes in steps S35 through S45 are again performed from the number one terminal 5.

In this way, by referring to the flag in the mode management table in the request processes, request polling signals are transmitted only to terminals 5 that are in the karaoke mode.

Next, operations in each terminal 5 will be explained. Each terminal 5 executes key input processes indicated by the flowchart in FIG. 7 and transmission interrupt processes shown in FIG. 8.

Figure 7:
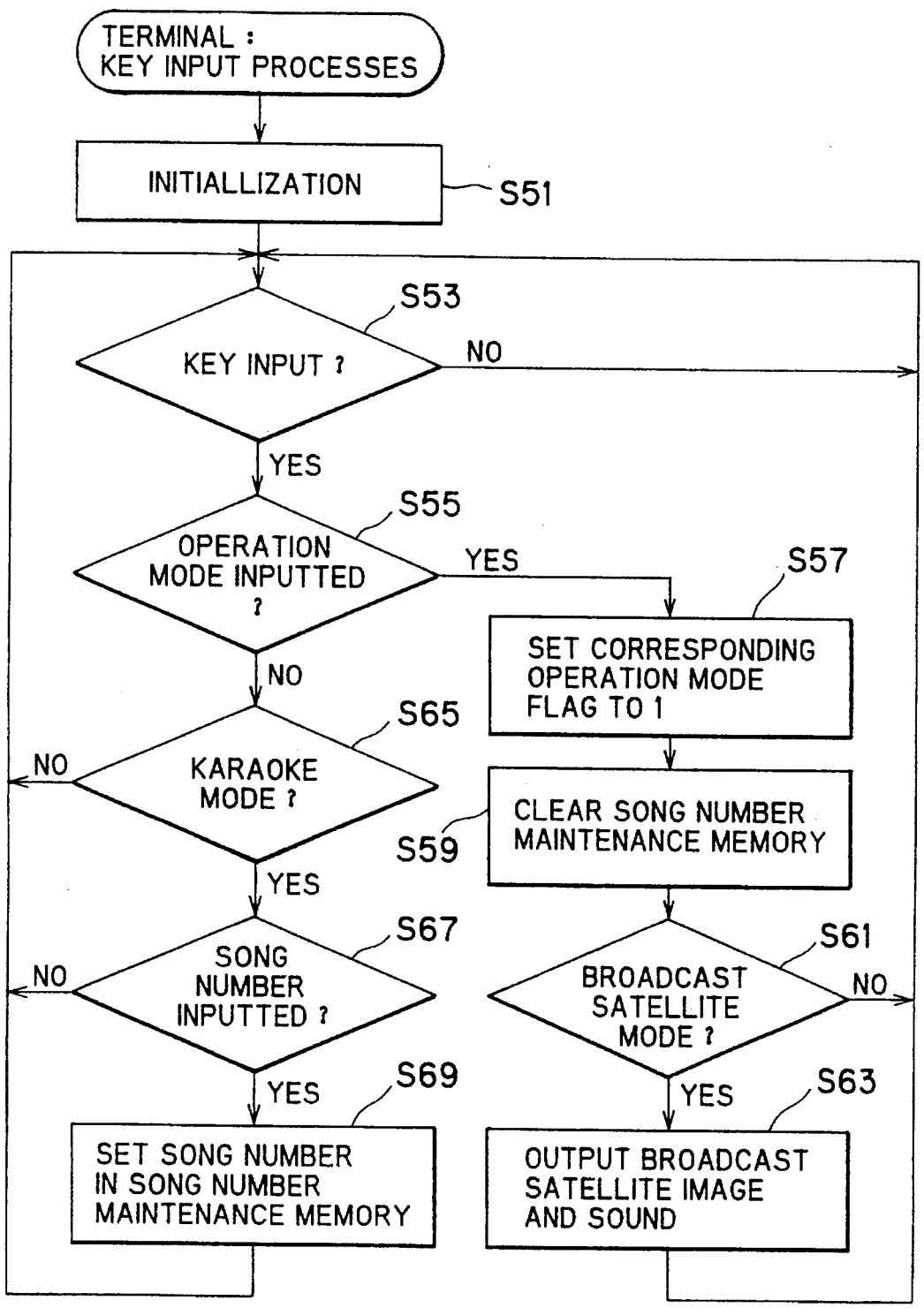
FIG. 7 is a flowchart showing key input operation in the terminal of the present embodiment.
Figure 8:
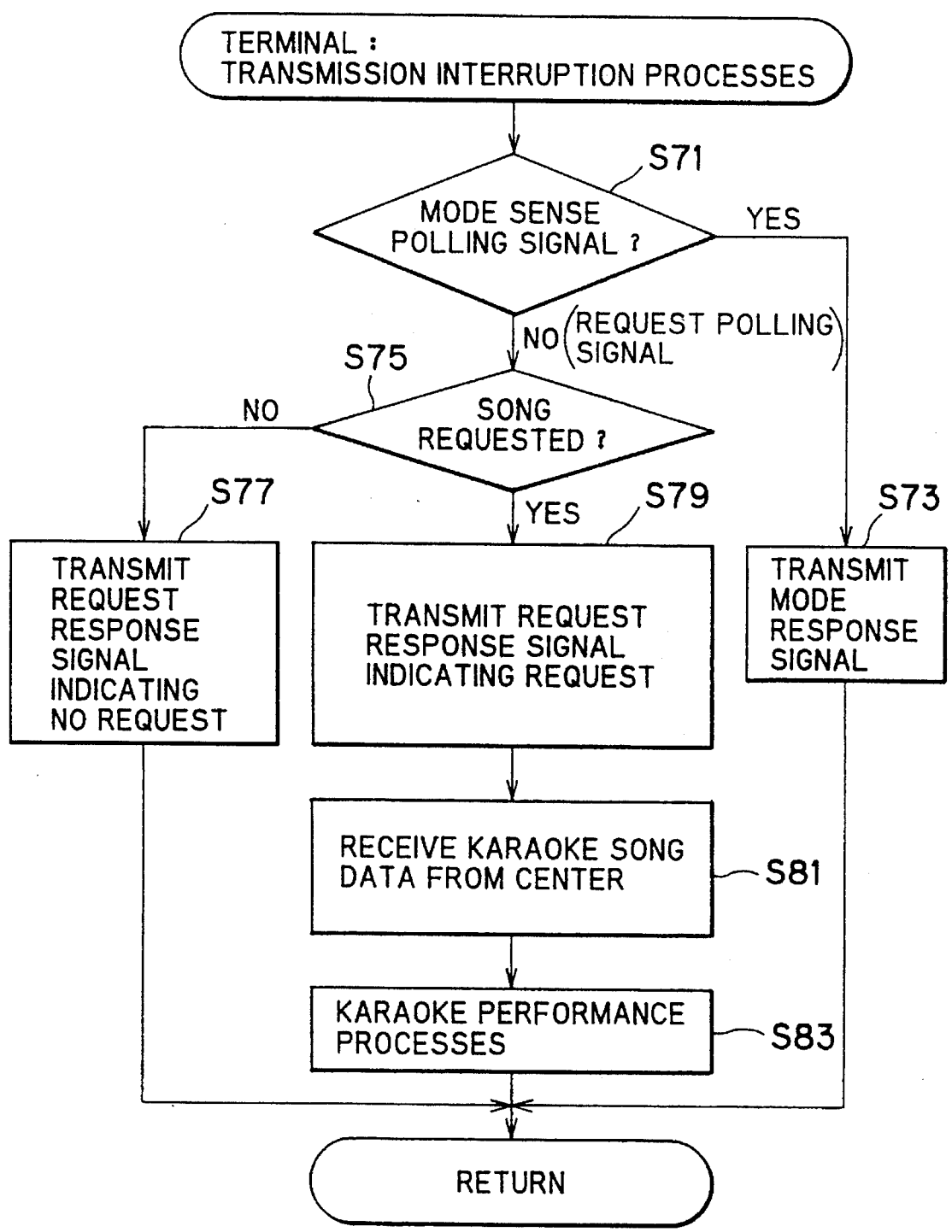
FIG. 8 is a flowchart showing transmission interrupt operations in a karaoke terminal of the present embodiment.

The key input processes of FIG. 7 are continually executed for detecting input from the keys of the input device 43 so as to receive the operation mode set to the terminal 5, input of the song number of a requested song, and the like. When mode sense polling signals or request polling signals are transmitted from the center 3, the key input processes are interrupted, and the transmission interruption processes of FIG. 8 are executed. The transmission interruption processes performs processes for transmitting a mode response signals, that indicate the present operation mode of the terminal, to the center 3 in response to the mode sense polling signal and for transmitting a request response signal, that responds as to whether a song has been requested at the terminal, in response to the request polling signal. When the karaoke song data is transmitted from the center 3 to the terminal, the transmission interruption processes also process the karaoke song data so that karaoke can be performed.

Here, a detailed explanation of the key input processes of FIG. 7 will be provided.

When the power source switch 43c is turned ON, the CPU 61 starts conducting the key input processes. The CPU 61 continues executing the key input processes, until the power source switch 43c is turned OFF.

In the key input processes, the CPU 61 in the control portion 41 first performs initialization to clear the RAM 65, in step S51. Then, the CPU 61 judges whether there has been some sort of key input from the input device 43 (that is, the key pad 43*a*, one of the mode keys 43*b*, and the like), in step S53. If no key input has been made, the program returns to step S53 and waits for key input.

On the other hand, when key input is determined as present in the step S53, the CPU 61 judges whether the input is for setting the operation mode by manipulation of the mode key 43*b*, in step S55. If the input is input of the operation mode, in step S57, the CPU 61 sets, to one (1), a flag for the corresponding operation mode in the operation mode table of the RAM 65. For example, if the key input sets the operation mode of the terminal into the karaoke mode, the flag for karaoke mode in the table is set to one (1).

Then, in step S59, the CPU 61 clears the song number maintenance memory in the RAM 65. In step S61, the CPU further judges whether the present mode is the broadcast satellite mode, by referring to the flag of the operation mode table. Here, if the present mode is the broadcast satellite mode, the CPU 61 controls the video tuner 59 so as to select the broadcast satellite channel. As a result, the broadcast satellite image and the broadcast satellite sound are outputted to the monitor television 53 and the speaker 49 is step S63.

On the other hand, if the mode is determined not to be the broadcast mode in the step S61, the program again returns to the step S53.

Then, if no input from the mode key 43*b* is determined in the S55, the CPU judges whether the present operation mode is the karaoke mode, in step S65, by referring to the operation mode table. If not, the program again returns to the step S53. If the present mode is the karaoke mode, the CPU judges whether the key input is a song number input of a requested song by the number pad 43*a* in step S67. If not, the program returns to the step S53. However, if the input is the song number input, the song number data is set in the above-described song number maintenance memory in the RAM 65, in step S69, whereupon the program returns to the step S53.

Next, a detailed explanation on the transmission interruption processes of FIG. 8 will be provided.

When the terminal 5 receives a mode sense polling signal or a request polling signal from the center 3, the CPU 61 interrupts the key input processes of FIG. 7 and executes the transmission interruption processes.

In the transmission interruption processes, the CPU 61 first judges whether the polling signal inputted from the center 3 is a mode sense polling signal or not is determined in step S71. If determined as a mode sense polling signal, the CPU 61 produces a mode response signal, referring to the flag presently set in the operation mode table in the RAM 65. It is noted that the mode response signal has data added thereto that indicates the present operation mode of the terminal. The CPU then transmits the mode response signal via the modem 57 to the center 3, in step S73.

On the other hand, if it is determined that the polling signal is a request polling signal in step S71, the CPU judges whether there is a song request or not in step S75, by referring to the song number maintenance memory in the RAM 65. If no request is determined, the CPU 61 produces a request response signal indicating no request. Then, the CPU transmits the request response signal via the modem 57 to the center 3 in step S77. Then, the program returns to the key input processes of FIG. 7.

If a request is determined in the step S75, the CPU produces a request response signal requesting transmission of karaoke song data of the requested song. Song number data and the like of the requested song are attached to this request response signal. The CPU transmits the request response signal via the modem 57 to the center 3 in step S79. Then, the terminal receives karaoke song data for the requested song transmitted from the center 3 in response to the request response signal. The CPU 61 temporarily stores the karaoke song data in the RAM 65 in step S81.

Afterward, karaoke performance processes are performed in step S83. In the karaoke performance processes, the CPU 61 first refers to the song name/song genre information previously stored in the RAM 65, based on which the CPU controls the video tuner 59 to select a channel over which the background image signals corresponding to the genre of the requested song are being transmitted. Then, the CPU retrieves the karaoke song data for the requested song from the RAM 65. The CPU inputs the lyric data included in the karaoke song data to the image composition circuit 51 where the lyric data is converted into a lyric/image signal. Also, the background image signal transmitted over the channel selected by the video tuner 59 is inputted to the image composition circuit 51. The background image signal and the lyric/image signal are superimposed by the image composition circuit 51, whereupon the characters of the lyrics are displayed on the monitor television 53 superimposed on the background image.

On the other hand, the CPU inputs the MIDI data (accompaniment data) included in the karaoke song data into the sound source 45, in which the MIDI data is converted into an accompaniment signal before being inputted to the amplifier 47. The accompaniment signal is mixed with the voice signal from the microphone 71 as sung by a user, amplified appropriately, and outputted to the speaker 49.

When the above-described karaoke performance processes of step S83 are completed, the program returns to key input processes of FIG. 7.

As described above, in the karaoke system 1 of the present embodiment, the center 3 transmits a mode sense polling signal, for confirming whether the operation mode of each karaoke terminal is karaoke mode, to each terminal 5 every time a predetermined duration of time passes. Each terminal 5 transmits to the center 3 a mode response signal indicating its present operation mode in response to this mode sense polling signal. The center 3 determines whether the operation mode of each terminal 5 is karaoke mode, based on this mode response signal. That is, when a mode response signal showing karaoke mode is received, that terminal is determined to be in karaoke mode. When no signal is transmitted within the predetermined time, or when a mode response signal indicating a mode other than the karaoke mode is received, the terminal is determined to not be in karaoke mode. According to the results of these determinations, request polling signals are transmitted only to terminals that are in the karaoke mode.

Therefore, request polling signals need not be transmitted to terminals that do not need karaoke song data (i.e, terminals 5 other than those in the karaoke mode). A great deal of wasteful polling time can be eliminated. Therefore, the waiting time until a request polling signal is received in a terminal 5 that is in the karaoke mode is reduced. Karaoke data of requested songs can be received in a short waiting time and users can immediately enjoy karaoke.

While the invention has been described in detail with reference to the specific embodiment thereof, it would be apparent to those skilled in the art that various changes and modifications may be made therein without departing from the spirit of the invention.

For example, in the above-described embodiment the mode sense polling signal and the request polling signal are transmitted on the same channel. However, these can be divided and transmitted on separate channels so that both types of polling signals can be transmitted simultaneously. Because mode sense polling signals can be transmitted more frequently, the center 3 can rapidly determine change in the operation mode of each terminal 5.

In the above-described embodiment, in order to transmit the karaoke song data to the number n terminal that has transmitted the request response signal indicating the request of transmission of the karaoke song data, the karaoke song data is added with the address code indicating the terminal number n. In other words, the number n terminal 5 determines that the karaoke song data added with the address code of the corresponding terminal number n is transmitted for itself. However, other various methods for transmitting the karaoke song data to the desired terminal are available. For example, the control portion 41 in each terminal 5 may be controlled so as to determine that any karaoke song data is for itself, if the karaoke song data is transmitted thereto within a predetermined period of time after the control portion 41 transmits the request response signal to the center 3.

Also, the present invention is not limited to application to a karaoke system but can also be applied to systems for providing various types of information such as weather reports and traffic information.

As described above, in a data transmission device according to the present invention, the central control unit transmits mode sense polling signals for confirming the operation modes of all the terminals. Each terminal transmits mode response signals indicating its present operation mode to the central control unit. A determination unit in the central control unit determines the operation mode of the terminals based on the mode response signals. A selection unit of the central control unit selects whether to transmit request polling signals to each terminal according to the determined operation mode.

Accordingly, the central control unit can select not to transmit request polling signals, that interrogate about request for transmission of information data, to terminals set to operation modes where information data is not needed. Therefore, the number of terminals to which request polling signals are transmitted can be reduced and wasted polling time can be eliminated. Accordingly, the waiting time until a request polling signal is received at a terminal is reduced and desired information can be obtained in a short waiting time.

What is claimed is:

1. A data transmission system for controlling transmission of information data via a transmission line from a central control unit to a plurality of terminals, the data transmission system comprising:

a central control unit; and a plurality of terminals connected to said central control unit via a transmission line, wherein said central control unit includes mode sense polling signal transmission means for transmitting a mode sense polling signal, via the transmission line, to each of the plurality of terminals for confirming an operation mode of each terminal said confirming occurring without determining whether each said terminal needs information or service;

wherein each of said plurality of terminals includes mode response signal transmission means for transmitting, in response to the mode sense polling signal, a mode response signal indicating a present operation mode of the each terminal to said central control unit via the transmission line, wherein said central control unit further includes:

determination means for determining the operation mode of each terminal, based on the mode response signal transmitted from each terminal; and request polling signal transmission means for selectively transmitting a request polling signal to a terminal that is determined by the determination means to be in the predetermined operation mode for detecting whether the terminal requests transmission of information data, wherein each of said plurality of terminals further includes request response signal transmission means for transmitting a request response signal indicating whether or not the terminal requests the transmission of information data when the terminal receives the request polling signal transmitted from the request polling signal transmission means, and wherein said central control unit further includes information data transmission means for selectively transmitting information data to a terminal that has transmitted the request response signal indicating that the terminal requests the transmission of the information data.

2. A data transmission system as claimed in claim 1, wherein each of said plurality of terminals further includes mode setting means for setting desired one of a plurality of operational modes including the predetermined operation mode.

3. A data transmission system as claimed in claim 2, wherein the mode sense polling signal transmission means successively transmits the mode sense polling signals to all of said plurality of terminals connected to said central control unit.

4. A data transmission system as claimed in claim 3, wherein the mode sense polling signal transmission means repeatedly transmits the mode sense polling signals to all of said plurality of terminals, every predetermined time period.

5. A data transmission system as claimed in claim 4, wherein said central control unit further includes data storing means for storing a plurality of information data, wherein each of said plurality of terminals further includes input means for inputting request for transmission of desired information data from the plurality of information data stored in the data storing means, the request response signal indicating that the corresponding terminal requests the transmission of desired information data including a code data indicative of the desired information data, and wherein said central control unit further includes data selecting means for selecting the desired information data from the plurality of information data stored in the data storing means, in accordance with the code data included in the request response signal, the information data transmission means transmitting the selected desired information data to the corresponding terminal.

6. A data transmission system as claimed in claim 5, wherein each of the plurality of information data stored in the data storing means includes information on corresponding one of a plurality of images, wherein the input means of each of said plurality of terminals includes image request means for inputting request for transmission of a desired image, wherein the selecting means selects the information data of the desired image and the information data transmission means transmits the information data of the desired image to the corresponding terminal, and wherein each of said plurality of terminals further includes output means for reproducing the information data into the desired image and for displaying the desired image.

7. A data transmission system as claimed in claim 5, wherein each of the plurality of information data stored in the data storing means includes information on corresponding one of a plurality of sounds, wherein the input means of each of said plurality of terminals includes sound request means for inputting request for transmission of a desired sound, wherein the selecting means selects the information data of the desired sound and the information data transmission means transmits the information data of the desired sound to the corresponding terminal, and wherein each of said plurality of terminals further includes output means for reproducing the information data into the desired sound and for playing the desired sound.

8. A data transmission system as claimed in claim 5, wherein the predetermined operation mode includes a karaoke mode for achieving a karaoke performance, wherein each of the plurality of information data stored in the data storing means includes lyric data and accompaniment data for a corresponding one of a plurality of karaoke songs, wherein the input means of each of said plurality of terminals includes karaoke song request means for inputting request for transmission of a desired karaoke song, wherein the selecting means selects the information data of the desired karaoke song and the information data transmission means transmits the information data of the desired karaoke song to the corresponding terminal, and wherein each of said plurality of terminals further includes output means for reproducing the information data into a lyric image and an accompaniment sound for the desired karaoke song and for displaying the lyric image and playing the accompaniment sound.

9. A data transmission device for transmitting information data via a transmission line to a plurality of terminals, upon requested by the plurality of terminals, the data transmission device comprising:

mode sense polling signal transmission means for transmitting a mode sense polling signal to each of a plurality of terminals connected to the data transmission device via a transmission line, to thereby detect an operation mode of the each terminal said operation detection occurring without determining whether each said terminal needs information or service;

request polling signal transmission means for selectively transmitting a request polling signal to a terminal that is detected by said mode sense polling signal to be in a predetermined operation mode, to thereby detect whether or not the terminal requests transmission of information data; and information data transmission means for transmitting the information data to the terminal that is detected by said request polling signal transmission means to request the transmission of the information data.

10. A data transmission device as claimed in claim 9, wherein each of the plurality of terminals transmits, in response to the received mode sense polling signal, a mode response signal indicating the operation mode of the each terminal, wherein said mode sense polling signal transmission means includes:

judging means for judging the operation mode of each terminal based on the mode response signal transmitted from the each terminal; and mode determination means for determining which of the plurality of terminals is in the predetermined operation mode, the request polling signal transmission means transmitting the request polling signal to the terminal that is determined to be in the predetermined operation mode.

11. A data transmission device as claimed in claim 10, wherein the terminal that is in the predetermined operation mode and that has received the request polling signal transmits, in response to the received request polling signal, a request response signal indicating whether or not the each terminal requests the operation mode of the each terminal, wherein said request polling signal transmission means includes:

judging means for judging whether the terminal requests the transmission of the information data, based on the request response signal transmitted from the terminal; and request determination means for determining whether the terminal in the predetermined operation mode request the transmission of the information data, the information data transmission means transmitting the information data to the terminal determined to request the transmission of the information data.

12. A method of controlling transmission of information data via a transmission line from a central control unit to a plurality of terminals, the plurality of terminals being connected to the central control unit via the transmission line, the method comprising the steps of:

transmitting a mode sense polling signal from a central control unit via a transmission line to each of a plurality of terminals for confirming an operation mode of each terminal said confirming occurring without determining whether each said terminal needs information or service;

transmitting, from each terminal to the central control unit via the transmission line, a mode response signal indicating a present operation mode of the each terminal, in response to the mode sense polling signal;

determining the operation mode of each terminal, based on the mode response signal transmitted from each terminal;

selectively transmitting a request polling signal from the central control unit to a terminal that is determined to be in the predetermined operation mode for detecting whether the terminal requests transmission of information data;

transmitting, from the terminal that has received the request polling signal to the central control unit, a request response signal indicating whether or not the terminal requests the transmission of information data, in response to the request polling signal;

selectively transmitting information data from the central control unit to a terminal that has transmitted the request response signal indicating that the terminal requests the transmission of the information data.

13. A method as claimed in claim 12, wherein the central control unit substantially continually transmits the request polling signals to the terminals that are determined to be in the predetermined operation mode, and wherein the request polling signal transmission is repeatedly interrupted at a predetermined time cycle so that the central control unit repeatedly transmits the mode sense polling signals to all the plurality of terminals at the predetermined time cycle.

14. A data transmission system for controlling transmission of information data via a transmission line from a central control unit to a plurality of terminals, the data transmission system comprising:

a central control unit; and a plurality of terminals connected to said central control unit via a transmission line, wherein said central control unit comprises mode sense polling signal transmission means for transmitting a mode sense polling signal, via the transmission line, to each of the plurality of terminals for confirming an operation mode of each terminal said confirming occurring without determining whether each said terminal needs information or service;

wherein each of said plurality of terminals includes mode response signal transmission means for transmitting, in response to the mode sense polling signal, a mode response signal indicating only a present operation mode of the each terminal to said central control unit via the transmission line, wherein said central control unit further comprises:

determination means for determining the operation mode of each terminal, based on the mode response signal transmitted from each terminal; and request polling signal transmission means for selectively transmitting a request polling signal to a terminal that is determined by the determination means to be in the predetermined operation mode for detecting whether the terminal requests transmission of information data, wherein each of said plurality of terminals further includes request response signal transmission means for transmitting a request response signal indicating whether or not the terminal requests the transmission of information data when the terminal receives the request polling signal transmitted from the request polling signal transmission means.

* * * * *